United States Patent [19]

Chlanda et al.

[11] Patent Number: 4,584,077

[45] Date of Patent: Apr. 22, 1986

[54] PROCESS FOR RECOVERING SODIUM CARBONATE FROM TRONA AND OTHER MIXTURES OF SODIUM CARBONATE AND SODIUM BICARBONATE

[75] Inventors: Frederick P. Chlanda, Rockaway; Krishnamurthy N. Mani, Denville, both of N.J.

[73] Assignee: Allied Corporation, Morris Township, Morris County, N.J.

[21] Appl. No.: 639,769

[22] Filed: Aug. 13, 1984

[51] Int. Cl.[4] .............................................. B01D 13/02
[52] U.S. Cl. ................................ 204/182.4; 204/301; 423/206 T
[58] Field of Search .............. 423/421, 422, 425, 427, 423/206 T, 188, 187; 204/301, 180 P, 182.4

[56] References Cited

U.S. PATENT DOCUMENTS 4,486,283 12/1984 Tejeda ............................ 204/180 P
4,498,706 2/1985 Ilardi et al. ..................... 423/206 T Primary Examiner—John F. Niebling
Assistant Examiner—B. J. Boggs, Jr.
Attorney, Agent, or Firm—Gus T. Hampilos; Gerhard H. Fuchs

[57] ABSTRACT

A process and a system for converting materials comprising sodium carbonate and sodium bicarbonate, such as dry-mined or subterranean deposits of trona, into a liquid comprising sodium carbonate substantially free of sodium bicarbonate. The process and the system incorporate the features of: (a) forming an aqueous solution comprising sodium carbonate and sodium bicarbonate; (b) removing a portion of said sodium bicarbonate from said solution to form a mother liquor comprising sodium carbonate and a reduced amount of sodium bicarbonate; (c) subjecting the mother liquor to electrodialytic water splitting by circulating the water liquor through an electrodialytic water splitter to produce a liquid reaction product comprising sodium carbonate substantially free of sodium bicarbonate; and (d) withdrawing the liquid reaction product comprising sodium carbonate substantially free of sodium bicarbonate from the electordialytic water splitter. The sodium carbonate solutions removed from the water splitter may be used as is, or subjected to further processing to produce a more concentrated final product. Two or three compartment electrodialytic water splitters can be used. The invention also details an effective method and system for isolating sodium carbonate by an electrodialysis process which eliminates the generation of $CO_2$ gas in the water splitter.

27 Claims, 7 Drawing Figures

PROCESS FOR RECOVERING SODIUM CARBONATE FROM TRONA AND OTHER MIXTURES OF SODIUM CARBONATE AND SODIUM BICARBONATE

BACKGROUND OF THE INVENTION

1. Field of the Invention

This invention relates to a process for converting mixtures of sodium carbonate and sodium bicarbonate, such as trona, into sodium carbonate. More particularly, this invention relates to two- and threecompartment electrodialytic water splitting processes for converting materials comprising sodium carbonate and sodium bicarbonate into a liquid comprising aqueous sodium and hydrogen ions, and a liquid comprising sodium carbonate substantially free of sodium bicarbonate from which high purity, high strength sodium carbonate can be recovered in high yields.

2. Description of the Prior Art

Most soda ash (sodium carbonate) produced in the United States is obtained from naturally occurring subterranean trona ore deposits located in southwestern Wyoming. Trona ore consists mainly of sodium sesquicarbonate ($Na_2CO_3 \cdot NaHCO_3 \cdot 2H_2O$, a hydrated sodium carbonate sodium bicarbonate double salt) and normally contains 4–13% insoluble impurities. A typical analysis of crude trona ore is:

|  | PERCENT BY WEIGHT |
|---|---|
| $Na_2CO_3$ | 41.8 |
| $NaHCO_3$ | 33.1 |
| $H_2O$ | 14.1 |
| NaCl | 0.04 |
| $Na_2SO_4$ | 0.01 |
| Iron | 0.08 |
| Water insolubles | 10.87 |

The composition of the crude trona ore corresponds quite closely to that of pure sodium sesquicarbonate except for the impurities present. Shale stringers or beds, normally present throughout a trona bed, will alter the amount of impurities in crude trona ore.

At the present time, these trona deposits are normally mechanically mined. For example, dry-mined trona ore is converted to soda ash by either a sesquicarbonate process or a monohydrate process (the features of both processes are summarized in U.S. Pat. No. 3,528,766 to Coglaiti et al). In the sesquicarbonate process, the trona ore is dissolved in hot aqueous alkali solution and, after separation of the resulting solution from the insolubles, sodium sesquicarbonate is crystallized from solution by cooling. The sesquicarbonate crystals are then separated from the mother liquor and, finally, calcined to recover soda ash (anhydrous sodium carbonate). In the monohydrate process, the trona ore is first calcined to convert its bicarbonate content to sodium carbonate and is then dissolved in water. After the resulting solution is separated from the insolubles, sodium carbonate monohydrate is precipitated by evaporative crystallization. The monohydrate crystals are then separated from the mother liquor and dried to recover soda ash.

While relatively effective, these processes suffer from several inherent disadvantages which seriously affect the efficiency and commercial viability of the processes. For example, because of the need for calcination steps, the processes are energy intensive (requiring the use of large amounts of coal, fuel oil, natural gas or mixtures thereof). This is especially disadvantageous because of the high cost and scarcity of hydrocarbon fuels. Furthermore, these procedures are not readily adapted for removal of soda ash from uncalcined trona values in dilute aqueous streams, as for example solutions obtained via direct solution mining, mine waters, or from calcined trona values in aqueous process streams such as pond liquors or crystallizer mother liquor purges.

Recently, solution mining techniques have been utilized as an alternative to dry-mining to recover soda ash from subterranean trona ore deposits Solution mining of subterranean trona deposits by using hot water or various alkaline solutions is well known. For example, U.S. Pat. No. 2,388,009 (Pike) discloses the use of a hot water or hot carbonate solution as the mining fluid See also U.S. Pat. Nos 2,625,384 (Pike et al.); 2,847,202 (Pullen); 2,979,315 (Bays); 3,018,095 (Redlinger); 3,050,290 (Caldwell et al.); 3,086,760 (Bays); 3,405,974 (Handley et al.) and 4,288,419 (Copenhafer et al.). Solution mining of subterranean trona deposits by using aqueous sodium hydroxide is disclosed by U.S. Pat. No. 3,184,287 (Gancy), U.S. Pat. No. 3,952,073 (Kube) and U.S. Pat. No. 4,344,650 (Pinsky et al.). U.S. Pat. No. 4,283,372 (Frint et al.) discloses the use of an aqueous ammonia solution as a mining fluid for trona These prior art solution mining processes, however, require substantial amounts of energy to manufacture sodium hydroxide, manufacture and recycle ammonia, supply high temperature mining solutions and, in some processes, calcine one or more intermediates.

In addition to trona, nahcolite (predominantly $NaHCO_3$) and wegscheiderite (predominately $Na_2CO_3 \cdot 3NaHCO_3$) are also sodium bicarbonate-containing ores from which it is possible to recover soda ash, after conversion of the bicarbonate to carbonate. Known deposits of nahcolite and wegscheiderite are located primarily in Utah and Colorado. No commercial operations are presently known to be recovering soda ash from these $NaHCO_3$-bearing minerals. Various U.S. patents disclose solution mining of nahcolite: for example, U.S. Pat. No. 3,779,602 (Beard et al.) and U.S. Pat. Nos. 3,792,902 (Towell et al.). In addition, U.S. Pat. No. 3,952,073 (Cube) and U.S. Pat. No. 4,283,372 (Frint et al.) disclose basic solution mining of nahcolite and wegscheiderite.

Electrochemical methods have been proposed for converting dilute aqueous solutions into usable products. Electrodialytic water-splitting is a process which has been successfully employed to recover valuable products from such dilute streams. For example, U.S. Pat. No. 4,082,835 (Chlanda et al.) discloses an electrodialytic process which utilizes two- or three-compartment water-splitters to remove $SO_2$ from dilute gas streams by means of (a) alkaline solution scrubbing, (b) regeneration of the scrubbing solution and, (c) liberation of concentrated $SO_2$. Another electrodialytic process is disclosed in U.S. Pat. No. 4,389,293 (Mani et al.) for the recovery of anhydrous hydrogen fluoride from dilute aqueous solutions of fluosilicic acid and hydroflouric acid.

An electrodialytic process for converting aqueous streams of trona into valuable products has been described in U.S. Pat. No. 4,238,305 (Gancy and Jenczewski). In this process, dilute aqueous trona is fed to the acid compartment of an electrodialytic cell for conversion into sodium hydroxide and carbon dioxide. The reaction products are either recovered and used separately, or combined in another reaction zone to provide soda ash. While relatively effective, the process requires that $H_2CO_3/CO_2$ be generated and liberated within the acid compartment which, consequently, increases the electric power necessary for the electrodialytic process.

SUMMARY OF THE INVENTION

Our invention is directed to an improved, energy efficient, electrodialytic water splitting process for converting trona and other mixtures of sodium carbonate and sodium bicarbonate into sodium carbonate in relatively high yields and high purity.

In accordance with the broadest aspect of the present invention, there is provided a process for converting materials comprising sodium carbonate and sodium bicarbonate into a liquid comprising sodium carbonate substantially free of sodium bicarbonate comprising the steps of:

(a) forming an aqueous solution comprising sodium carbonate and sodium bicarbonate;

(b) removing a portion of said sodium bicarbonate from said solution to form a mother liquor comprising sodium carbonate and a reduced amount of sodium bicarbonate;

(c) subjecting the mother liquor to electrodialytic water splitting by circulating the mother liquor through an electrodialytic water splitter to produce a liquid reaction product comprising sodium carbonate substantially free of sodium bicarbonate; and, (d) withdrawing the liquid reaction product from the electrodialytic water splitter.

In one embodiment of the present invention, the process employs a two-compartment electrodialytic water splitter comprising alternating cation and bipolar membranes forming alternating base and acid compartments positioned between two electrodes for converting the mother liquor into the liquid reaction product. In this embodiment the mother liquor is introduced into the base compartment formed by an anion permselective face of a bipolar membrane and a face of a cation permselective membrane, and an aqueous solution comprising sodium ions is introduced into the acid compartment formed by a cation permselective face of said bipolar membrane and a face of a cation permselective membrane. Direct current is passed through the two-compartment electrodialytic water splitter for a time sufficient to add hydroxide ions to said mother liquor in an amount to produce the liquid reaction product comprising sodium carbonate substantially free of sodium bicarbonate, and to produce a liquid reaction product comprising sodium ions and hydrogen ions in the acid compartment with some sodium ions from the acid compartments being transfered to the base compartments. The liquid reaction products are then removed from their respective compartments.

In another embodiment of the present invention, the process employs a three-compartment electrodialytic water splitter comprised of alternating cation, bipolar and anion membranes forming alternating base, acid and salt compartments positioned between two electrodes for converting the mother liquor into liquid reaction products. In this embodiment the mother liquor is introduced into the base compartments formed by an anion permselective face of a bipolar membrane and a face of a cation permselective membrane, an aqueous solution comprising sodium ions is introduced into the salt compartment formed by a face of an anion permselective membrane and a face of a cation permselective membrane, and a liquid comprising water is introduced into the acid compartment formed by a cation permselective face of a bipolar membrane and a face of an anion permselective membrane. Direct current is passed through said electrodialytic water splitter for a time sufficient to add hydrogen ions into the liquid comprising water in the acid compartment, to add hydroxide ions into the mother liquor in the base compartment in an amount sufficient to produce a liquid reaction product comprising sodium carbonate substantially free of sodium bicarbonate, and to transfer sodium ions from the aqueous solution comprising the sodium ions to said mother liquor base compartments. A portion of the solution comprising aqueous sodium ions is transfered from the salt compartments to the acid compartments. The liquid reactions products are then removed from their respective compartments.

The liquid reaction product comprising sodium carbonate may be used as is, or isolated as a solid by using an energy efficient process which comprises crystallizing sodium carbonate from solutions containing same by adding thereto a liquid loading substance such as ammonia.

DETAILED DESCRIPTION OF THE INVENTION

Figure 1:
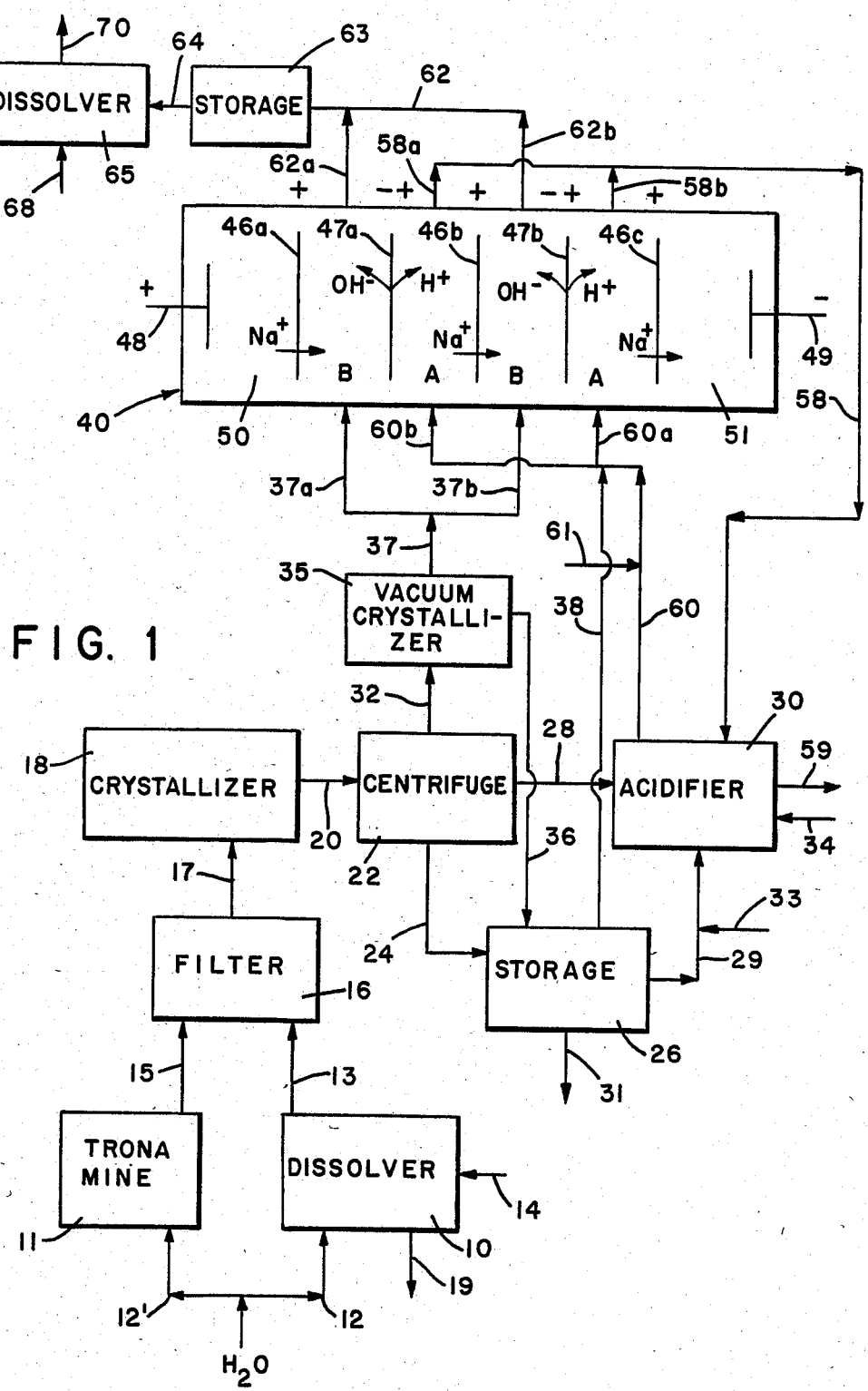
FIG. 1 is a flow diagram of an embodiment of the present invention using a two-compartment electrodialytic water splitter.

The present invention is directed to energy efficient two- and three-compartment electrodialytic water splitting processes for the recovery of high strength, high purity sodium carbonate and high strength, high purity carbon dioxide gas from solutions of calcined or uncalcined trona or other solutions which comprise mixtures of sodium carbonate and sodium bicarbonate. In one embodiment of the present invention, the sodium carbonate (substantially free of sodium bicarbonate) and carbon dioxide reaction products can be easily recovered for separate use. In other embodiments, the sodium carbonate containing liquid reaction product, which also includes sodium hydroxide, may be combined with trona, sodium bicarbonate or carbon dioxide in another reaction zone to provide a higher concentration of sodium carbonate.

More specifically, we have discovered a process wherein uncalcined trona ore, such as dry-mined or subterranean deposits of trona ore, or other mixtures of Na₂CO₃ and NaHCO₃ is dissolved in hot water to form a hot aqueous solution, cooled to cause a portion of the NaHCO₃ to crystallize and the Na₂CO₃-rich "mother liquor" is then subjected to electrodialytic water splitting. The quantity of NaHCO₃ removed from the solution is in the range of from about 20 to about 80 weight percent, preferably in the range of from about 40 to about 80 weight percent, and optimally from about 50 to about 80 weight percent based on the total weight of the NaHCO₃ in the hot solution. The mother liquor is then introduced into a base compartment of a two- and/or a three-compartment electrodialytic water splitting cell. An aqueous solution comprising sodium cations is introduced into an acid compartment of a two- or a salt compartment of a three-compartment water splitter. A liquid reaction product comprising Na₂CO₃ substantially free of NaHCO₃, and a liquid reaction product comprising sodium ions and hydrogen ions result from the process. In a preferred embodiment of the process, Na₂CO₃-containing liquid reaction product is contacted in a reaction zone external to the water splitter with a high strength, high purity liquid loading substance such as NH₃ to provide a soda ash solution of increased concentration over the concentration in the liquid reaction product, e.g. at least about a 30 weight % aqueous sodium carbonate-containing product (preferably about 37 weight %).

The two-compartment water splitter used in the present invention incorporates a plurality of cation and bipolar ion exchange membranes arranged in an alternating fashion between two electrodes thus forming an electrodialysis stack (the basic stack design is the same as is described in U.S. Pat. No. 4,082,835 to Chlanda et al. for electrodialytic water splitting of sodium bisulfite and similar salts). The electrodialysis stacks are for example, available commercially from Asahi Glass Co., 1-2, Marunochi 2-Chrome, Chiyoda-ku, Tokyo, Japan; Ionics, Inc., Watertown, Massachusetts and other commercial sources. In addition, stacks which are suitable for electrolyte concentration such as the Asahi Model CU-IV, may also be used for the water splitter when modified to include membranes of a kind adaptable to water splitting.

The three-compartment water splitter used in the present invention incorporates a plurality of cation, bipolar and anion membranes arranged in an alternating fashion between two electrodes to provide alternating base, acid and salt compartments that form an electrodialytic stack.

The two- and three-compartment water splitters employ bipolar membranes, for example, as described in U.S. Pat. No. 2,829,095 to Oda et al. (which has reference to water splitting generally), in U.S. Pat. No. 4,024,043 (single film bipolar membrane) or in U.S. Pat. No. 4,116,889 (cast bipolar membrane), all of which are thereby incorporated by reference. Other types of bipolar membrane which effectively convert water into hydrogen and hydroxyl ions may also be used.

The use of bipolar membranes is preferred because of the simplicity of equipment. However, when suitable bipolar membranes are not readily available, an equivalent structure (not shown) may be used to function as a bipolar membrane in the water splitting operation. Such structure may consist of an anion permselective membrane, a cation permselective membrane and a compartment defined therebetween which contains an electrolyte solution. In this arrangement the compartment contains an electrolyte solution which cannot pass through, clog or coat the membranes, e.g., an aqueous solution of polystyrene sulfonic acid which does not migrate through the pores of the membranes because of the large size of the polystyrene molecules and the relatively small size of the pores of the membranes. Polyfunctional bases, e.g., polyvinylbenzyltrimethylammonium sulfate, may also be used as the electrolyte in this compartment.

The cation membranes useful in the process of the present invention may be weakly acidic or strongly acidic cation permselective membranes. Particularly useful cation membranes are Dupont's Nafion ® acidic fluorocarbon membranes, especially Nafion ® 110, 901 and 24.

Among the anion membranes found useful in the process of the present invention are weakly basic or strongly basic membranes such as are commercially available from Ionics Inc., Watertown, Massachusetts (sold as Ionics 204-UZL-386), from Asahi Chemical Industry Corp., from Asahi Glass Co., (AMV anion membranes) or from Tokuyama Soda.

As stated above, other mixtures containing Na₂CO₃ and NaHCO₃ can be used in the process of this invention including, but not limited to: sodium carbonate crystallizer mother liquor; purge pond and solution mining waters containing trona or raw, uncalcined trona; and, an aqueous brine containing Na₂CO₃, NaHCO₃, NaCl and Na₂SO₄. Thus, one of the advantages of the process of the present invention is that high purity, high strength Na₂CO₃ substantially free of NaHCO₃ can be produced from a wide variety of solutions containing mixtures of Na₂CO₃ and NaHCO₃.

As will be apparent from the detailed description of the present invention, our process is significantly different than the electrodialytic process disclosed in U.S. Pat. No. 4,238,305. In the process described therein, trona ore is reacted with NaOH (which is produced from the electrodialysis of trona in a first process step) in accordance with the following reaction:

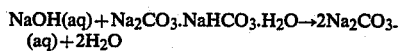

In this prior art process, a maximum of two moles of Na₂CO₃ are produced per equivalent of hydroxyl anion produced by electrodialysis. In our process, the conversion of trona to Na₂CO₃ proceeds according to the following reactions:

(a) 2NaHCO₃.Na₂CO₃.H₂O+H₂O (hot)→2Na₂CO₃ (hot ag)+2NaHCO₃ (hot aq)

(b) 2Na₂CO₃ (hot aq)+2NaHCO₃ (hot aq)→NaHCO₃ (S)+NaHCO₃ (cool/aq)+2Na₂CO₃ (cool/aq)

(c) 2Na₂CO₃ (cool aq)+NaHCO₃ (cool aq)+NaOH→ 3Na₂CO₃ (cool aq)

Thus, by removing at least 50% of the NaHCO₃ by crystallization before subjecting the aqueous trona solution to electrodialysis (reaction b), three moles of Na₂CO₃ are obtained per equivalent of OH⁻ generated as opposed to a maximum of only two moles of Na₂CO₃ per equivalent of OH⁻ generated in the prior art process. This represents a 50% increase in efficiency in the electrodialysis step. This increase in efficiency results in a reduction in both the membrane area and the electric power necessary for the electrodialysis step.

An additional advantage of our process is that it produces a high purity aqueous Na₂CO₃ reaction product having a Na₂CO₃ concentration of at least about 15 weight percent (based on the total weight of the solutions), normally between about 15 to about 35 weight percent and preferably from about 20 to about 35 weight percent. Thus, because of the high concentration of $Na_2CO_3$ in the liquid reaction product, the energy necessary to recover the $Na_2CO_3$ from the liquid reaction product is substantially reduced.

Another advantage of a preferred embodiment of our process is that it can be carried out at or near the peak efficiency of three moles of $Na_2CO_3$ per Faraday, and a current efficiency approaching 100%. The process can also be carried out at a low unit cell potential which, in the preferred embodiments of this invention is less than about 2.5 volts and in the most preferred embodiments is less than about 1.8 volts.

Still another advantage of our electrodialysis process is related to the fact that trona ore forms a solution in hot water. Therefore, our process is particularly advantageous for solution mining of trona, where hot water can be pumped underground to dissolve the trona ore and form an aqueous solution which is returned to the surface where it is subjected to the remaining steps of our basic process.

Other advantages of our invention will become evident from the detailed description of the process provided hereinbelow.

Referring to FIG. 1, dry-or mechanically- mined trona and/or other mixtures of $Na_2CO_3$ and $NaHCO_3$ are introduced (as batches or continuously) via a feed line 14 into a dissolver 10 which contains a quantity of water heated to between about 70° C. to about 100° C. (preferably about 70° C. to about 90° C.) and introduced into the dissolver 10 through a feed line 12. The hot water in the dissolver 10 is agitated until sufficient trona dissolves so that a mixture of a saturated aqueous solution and insolubles is formed. The saturated solution is then fed into a filtration system 16 (e.g, separators/clarifiers and centrifuges) via a line 13 wherein insolubles such as grit, or any other solid materials which can coat or clog the apparatus used in the process are removed via line 19. Alternatively, the aqueous solution may be obtained by hot solution mining, in which the hot water is pumped, via line 12', underground to dissolve a portion of a subterranean deposit 11 of trona ore. The hot solution is then pumped to the surface and fed directly to the filtration system 16 via a feed line 15.

The hot clarified solution in the filtration system 16 can either be stored in solution form in a clarifier receiver (not shown) or conveyed to a bicarbonate crystallizer 18 by way of a line 17. Normally, the temperature of the clarified solution is about 90° C. and, usually, the clarified solution contains about 12-16 weight % $Na_2CO_3$ and about 9-13 weight % $NaHCO_3$, preferably about 15.5 weight % $Na_2CO_3$ and about 12.5 weight % $NaHCO_3$.

In bicarbonate crystallizer 18, the hot trona solution is cooled to about 60° C., which causes a portion (from about 20 to about 80 weight %) of the dissolved sodium bicarbonate to precipitate or crystallize thereby forming a mixture of a mother liquor containing reduced amounts of sodium bicarbonate as compared to the original solution, and precipitated or crystallized sodium bicarbonate ($NaHCO_3$). The mother liquor/crystallized $NaHCO_3$ mixture is fed through a line 20 to a centrifuge 22 wherein the liquid and solid phases are separated. At least a portion of the precipitated or crystallized sodium bicarbonate is fed to an acidification tank 30 via a line 28 and the remainder (if any) is fed to a bicarbonate storage tank 26 via a line 24 where it is stored for later use as, for example, a source of sodium cations ($Na^+$).

The mother liquor from centrifuge 22 is fed to a secondary bicarbonate vacuum crystallizer/centrifuge 35 via a line 32. In this secondary unit 35, a second cooling step, wherein the solution is cooled to about 30° C., causes further precipitation or crystallization of sodium bicarbonate crystals from the mother liquor. The mixture of the mother liquor, which now contains about 12 to about 17% $Na_2CO_3$ preferably 16% and about 4% to about 6% $NaHCO_3$, normally about 5% $NaHCO_3$, and crystallized sodium bicarbonate is then centrifuged. Crystallized sodium bicarbonate is fed to the bicarbonate storage tank 26 through a line 36 and the mother liquor, which has had at least about 50 weight % of the sodium bicarbonate removed, is fed to the electrodialysis unit 40 via line 37 or, optionally, stored in a storage unit (not shown) until needed.

The process illustrated in FIG. 1 employs a two-compartment electrodialytic water splitter. The solution from crystallizer 35 is fed via the line 37 into base compartments B of the two-compartment electrodialysis unit 40 as streams 37a and 37b. At the same time, a solution containing sodium cations ($Na^+$) is introduced into the acid compartments A of the two-compartment electrodialysis unit 40. In this embodiment, the solution of sodium cations ($Na^+$) may be obtained by feeding crystallized sodium bicarbonate in storage tank 26 into acid compartments A of the two-compartment electrodialysis unit 40. Since carbon dioxide gas would normally be generated by reaction of hydrogen ions (generated in the acid compartments A) with the bicarbonate, supplying bicarbonate directly to the acid compartments normally requires the application of a positive back pressure. Preferably, the sodium bicarbonate is introduced into an acid tank 30 and is dissolved in water supplied through line 34 or through line 29 (via line 33). Sodium bisulfate solution (from $Na_2SO_4$ and $H_2SO_4$) is reacted with the bicarbonate to generate sodium sulfate and carbon dioxide gas which is bled from the acid tank via a line 59. The resulting sodium sulfate solution (which includes small amounts of sodium bisulfate) is fed via lines 60, 60a and 60b into acid compartments A as the source of sodium ions. The elimination of the bicarbonate in the acid compartments A eliminates the formation of carbon dioxide in such compartments and, consenquently, the application of a positive back pressure.

The two-compartment electrodialytic water splitter 40 comprises a plurality of alternating acid compartments A and base compartments B which incorporate a plurality of cation permselective membranes 46 a-c, and bipolar ion exchange membranes 47 a-b arranged in alternating fashion between an anode 48 and cathode 49. Each of the base compartments B is bounded by a cation permselective ion exchange membrane 46, and an anion face of a bipolar ion exchange membrane 47, and each of the acid compartments A is bounded by the cation face of the bipolar ion exchange membrane 47, and a cation permselective exchange membrane 46. For convenience, the assembly shown in FIG. 1 contains only two acid/base compartment cells. However, in practice, the assembly may contain up to several hundred or more of such cells where greater capacity is desired. The anode 48, is conventionally constructed of platinum or a like metal. Anode 48 is immersed in an anolyte such as a dilute aqueous sulfuric acid, sodium hydroxide, sodium sulfate or like aqueous solution contained in an anolyte compartment 50. The cathode 49, which can be any conventional kind is also usually made of platinum, carbon, steel and the like. Cathode 49 is immersed in a catholyte, such as a dilute sulfuric acid solution, contained in a catholyte compartment 51. The anolyte and catholyte can be the same solution. Cathode 49 and anode 48 are connected to a suitable direct current source.

The operation of the two-compartment electrodialysis unit 40 is described herein. A direct current is passed from anode 48 to cathode 49. Streams 60a and 60b which preferably contain sodium sulfate from the acid tank 30 are fed into acid compartments A, and streams 32a and 32b which preferably contain about 16 weight % of $Na_2CO_3$ and about 5 weight % of $NaHCO_3$ are fed into base compartments B. In acid compartments A, hydrogen ions ($H^+$) from bipolar membranes 47a-b are introduced. The hydrogen ions ($H^+$) convert the sulfate ($SO_4^=$) anions into bisulfate ($-HSO_4$) anions. The continued presence of anions sustains ion-current flow in acid compartments A which is particularly important in maintaining low unit cell potentials. In the embodiment wherein sodium bicarbonate is fed to the acid compartments A, the hydrogen ions convert the bicarbonate anions ($-HCO_3$) to carbonic acid ($H_2CO_3$) which, in turn, converts into $H_2O$ and $CO_2(g)$. Only the presence of anionic impurities, e.g., chloride ion ($Cl$), sulfate ion ($SO_4^=$), etc. which retain their negative charge in a solution containing hydrogen ion ($H^+$) sustain ion-current flow in acid zones A when the conversion of $HCO_3^-$ is substantially, i.e., greater than 90%, complete. Thus, a convenient source of anions, such as from $NaCl$, $Na_2SO_4$ and the like may need to be added to the bicarbonate fed from the storage tank 26 to the acid compartments A.

Liberating the carbon dioxide prior to and external to the electrodialytic water splitter offers the following advantages:

(1) cell construction is simplified and standardized and the application of a back pressure on the electrodialytic water splitter cell to suppress $CO_2$ formation is not necessary;

(2) the bipolar membrane efficiency is improved by avoiding formation of weakly ionized $H_2CO_3$ acid in the acid compartments, and by avoiding the diffusion of dissolved $CO_2$ gas through the bipolar membrane into the base compartments B (thereby decreasing the overall base, e.g., sodium hydroxide purity and production efficiency);

(3) the average cell voltage is lower because there is no formation of nonconductive bubbles of $CO_2$ gas,; and (4) the service lifetime of the bipolar membranes and gaskets is significantly extended by operating the system to produce base while avoiding the in situ evolution of $CO_2$ gas.

In base compartments B, hydroxyl ions ($OH^-$) are introduced from the bipolar membranes 47a-b. The hydroxyl ions react with the sodium ($Na^+$) ions that migrate from acid compartments A through cation membranes 46a-c to form sodium hydroxide ($NaOH$) which, in turn, reacts with bicarbonate ions ($HCO_3^-$) in the base compartments B to form aqueous sodium carbonate ($Na_2CO_3$) As is apparent, the electrodialysis unit 40 is designed so that sodium ions ($Na^+$) and hydroxyl ions ($OH^-$) are allowed to migrate into base compartments B under the influence of applied electric potential, and both ions are constrained from migrating out of the base compartments B by virtue of the cation-permselective membranes 46a-c, the anion face of the bipolar membranes 47a-b and the applied potential of the electrodialysis assembly. Thus, the net result in the base compartments B is an increase in the concentration of these chemical species, and consequently, an increase in the concentration of sodium carbonate (with the formation of sodium hydroxide).

The reactions in the electrodialysis unit 40 can be schematically represented as follows:

Acid Compartments (A)

($NaHCO_3$ fed)

(a) $NaHCO_3 \rightarrow Na^+ + HCO_3^-$
(b) $Na^+ + HCO_3^- + H^+ - Na^+ (to\ B) \rightarrow H_2CO_3(aq)$
(c) $H_2CO_3(aq) \rightarrow H_2O + CO_2(g)$ Acid Compartments (A)

($Na_2SO_4$ fed)

$2Na_2SO_4 \rightarrow 4Na^+ + 2SO_4^=$
$4Na^+ + 2SO_4^= + 2H^+ - 2Na^+ (to\ B) \rightarrow Na_2SO_4(aq) + H_2SO_4$ Base Compartments (B)

$3Na^+ + 2OH^- + HCO_3^- \rightarrow H_2O + CO_3^= + 3Na^+ + OH^-$
$OH^- + Na^+ \rightarrow NaOH(aq)$
$2Na^+ + 2CO_3^= + 2Na^+ (from\ A) \rightarrow 2Na_2CO_3(aq)$ On completion of the electrodialysis step, the contents of each base compartment B are drawn off by conventional means, such as an overflow valve or piping system 62a and 62b, collected as a stream 62 and conveyed to product solution storage tank 63. The concentration of sodium carbonate in the product solution is at least about 14 weight percent, and preferably in the range of from about 14 to about 23 weight percent. In the more preferred embodiments of this invention, the product solution contains about 18 weight % of sodium carbonate and 3 weight % of sodium hydroxide.

The sodium carbonate solution removed from the base compartments B of the two- or three- compartment water splitters is substantially free of sodium bicarbonate. The the term "substantially free of sodium bicarbonate" as used herein means less than 0.1 percent by weight of sodium bicarbonate.

After storage, the product solution can be conveyed by way of a line 64 to dissolution tank 65 to produce about a 30 weight % sodium carbonate containing solution. Further processing to produce about a 30 weight % $Na_2CO_3$ solution is preferably accomplished in accordance with the embodiments illustrated in FIGS. 3-5 and described in detail hereinbelow.

In the embodiment of the present invention wherein aqueous $Na_2SO_4$ is fed into the acid compartments A, the $Na_2SO_4/H_2SO_4$ reaction product ($NaHSO_4$) of such compartments is removed via the lines 58a and 58b, collected in the line 58 and fed into the acidification tank 30. The partially converted acidified sulfate (i.e., $NaHSO_4$) reacts with the crystallized $NaHCO_3$ in the tank 30 accordance with the reaction:

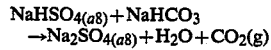

The neutralized $Na_2SO_4$ salt is then returned to the acid compartments A via the line 60 as the aqueous supply of $Na^+$ ions. To assist in the complete conversion of the acidified sulfate to $Na_2SO_4$, aqueous solutions of $Na_xH$ $_{2-x}SO_4$ or $Na_xH_{3-x}PO_4$ (where x is 0 to 2), and HCl/NaCl and carboxylic acids such as acetic or formic acid (or mixtures thereof) can be added to the acid tank 30. A preferred additive is a solution of a weak acid (such as acetic acid), a stronger acid (such as $H_2SO_4$) and a sodium salt. The high permselectivity of the cation membrane insures that contamination of the product ($Na_2CO_3$) by migration of the negative ions such as $SO_4^=$, $HPO_4^=$, etc. is minimal.

Figure 2:
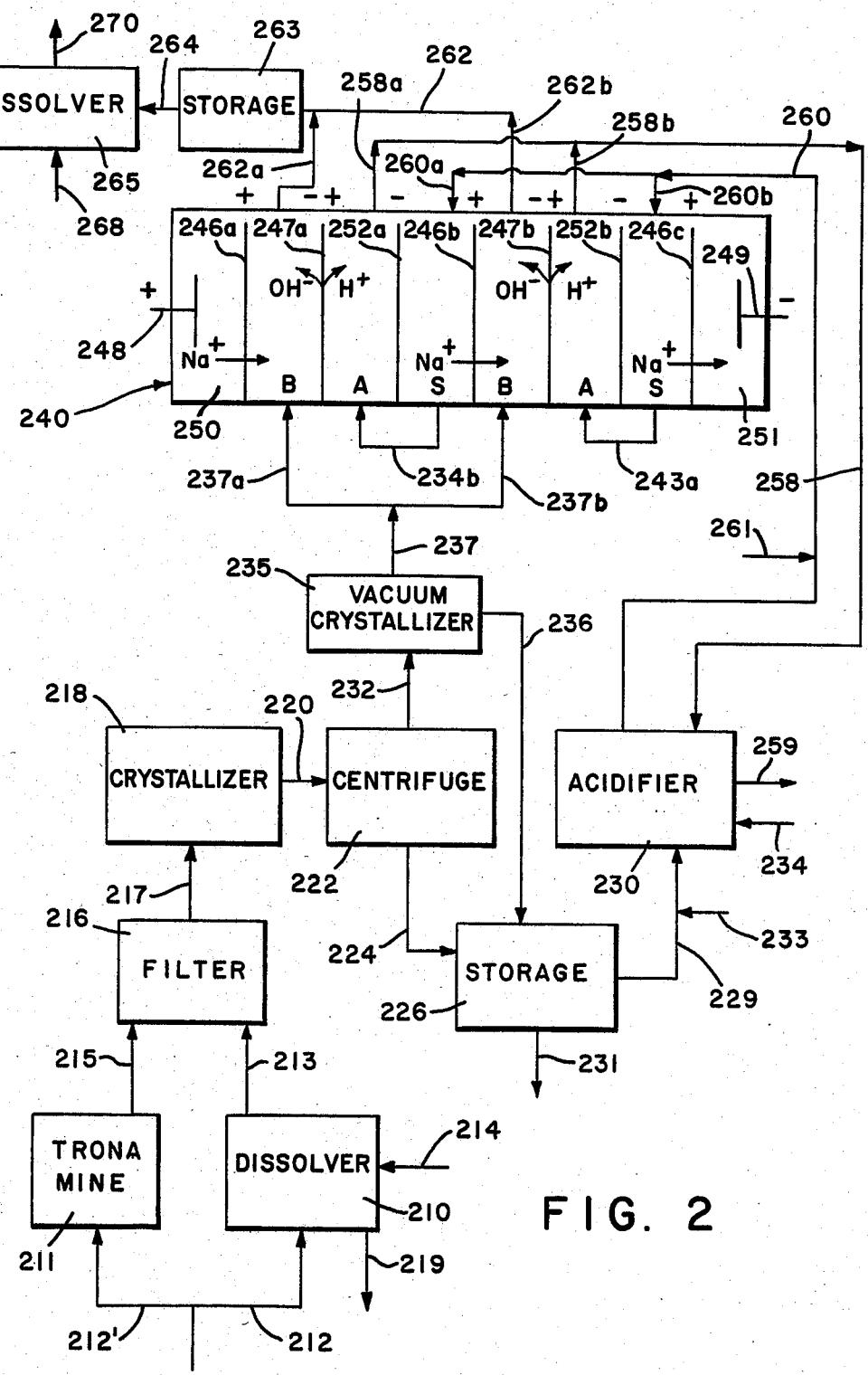
FIG. 2 is a flow diagram of another embodiment of the present invention using a three-compartment water splitter.

In the embodiment of the invention wherein $NaHCO_3$ is fed to the acid compartments A, the $H_2CO_3$/$CO_2(g)$ product of acid compartments A is removed via streams 58a, 58b, collected as a stream 58 and bubbled through the sodium bicarbonate in the acid tank 30 which scrubs the carbon dioxide ($CO_2$) gas thereby removing impurities. After scrubbing, the $CO_2$ gas is collected via line 59. The carbon dioxide gas can be stored, or it can be fed into base zone B under pressure where the gas undergoes various reactions which result in the formation of carbonate, ($CO_3^=$) ions, and the eventual production of sodium carbonate. The reactions are set forth as follows:

(a) $CO_2(g) + H_2O \rightarrow H_2CO_3(g)$
(b) $H_2CO_3(aq) + NaOH \rightarrow H_2O + NaHCO_3$
(c) $NaHCO_3 + NaOH \rightarrow H_2O + Na_2CO_3$ FIG. 2 illustrates another embodiment of the process of the present invention which employs a three-compartment electrodialytic water splitter and the system for the external liberation of $CO_2$. In a manner exactly analogous to that illustrated and described with reference to FIG. 1, trona, in a dissolver 210 or a mine 211, is contacted with hot water fed by lines 212 and 212', respectively, to form a hot solution. The hot solution is removed by lines 213 and 215, respectively, and fed to a bicarbonate crystallizer 218. Waste material from the dissolver is removed therefrom via a line 219. In bicarbonate crystallizer 218, the hot trona solution is cooled to about 60° C., which causes a portion of the dissolved sodium bicarbonate to precipitate or crystallize thereby forming a mixture of a mother liquor (containing reduced amounts of sodium bicarbonate as compared to the original solution) and precipitated or crystallized sodium bicarbonate ($NaHCO_3$) The mother liquor/crystallized $NaHCO_3$ mixture is fed via line 220 to a centrifuge 222 wherein the liquid and solid phases are separated. The precipitated or crystallized sodium bicarbonate is fed to bicarbonate storage tank 226 via a line 224, to be stored for later use as, for example, a source of sodium cations for feeding to the acid compartments A of the three-compartment electrodialysis unit 240.

The mother liquor in centrifuge 222 is fed to a secondary bicarbonate crystallizer/centrifuge 235 via a line 232 wherein the solution is further cooled to about 30° C. to precipitate or crystallize more bicarbonate. The mother liquor from the secondary crystallizer/centrifuge 235 may contain from about 12 to about 17 weight % sodium carbonate and from about 4 to about 6 weight % sodium bicarbonate, and normally contains about 16 weight % sodium carbonate and about 5 weight % sodium bicarbonate. Crystallized bicarbonate is fed via a line 236 to bicarbonate storage tank 226. The mother liquor is fed via a line 237 through lines 237a and 232b to base compartments B of the electrodialysis unit 240 or, optionally, stored in a storage tank (not shown) until needed.

The solution of sodium cations is obtained by feeding the crystallized sodium bicarbonate in the bicarbonate storage tank 226 via a line 229 to an acidification tank 230. Water may be added to the tank 230 via line 229 and 233 or, alternately, added directly to acid tank 230 via a line 234. A solution of sodium sulfate and sulfuric acid [as $NaHSO_4(aq)$] is fed to acid tank 230 wherein the hydrogen ions react with the bicarbonate to generate sodium sulfate and carbon dioxide gas. The $CO_2$ gas is bled from the acid tank 230 via a line 259. The resulting sodium sulfate solution (which includes small amounts of sodium bisulfate) is fed via lines 260, 260a and 260b into salt compartments S of the electrodialytic water splitter 240. Additionally, make-up sodium sulfate may be added to line 260 via a line 261.

The three-compartment electrodialytic water splitter 240 comprises a plurality of alternating base B, acid A and salt zones S arranged in that order between an anode 248 and a cathode 249. For convenience, the assembly shown in FIG. 2 contains only 2 base/acid/salt compartment cells. However, in practice the assembly may contain up to several hundred or more of such cells where greater capacity is desired. The design of the anode 248 and the cathode 49, and the make up of the catholyte and anolyte are similar to those used in the two-compartment unit 40 (FIG. 1). A source of direct electric current is provided to supply current to the cathode 249 from the anode 248. A plurality of cation permselective membranes 246a-c bipolar membranes 247a and 247b and anion permselective membranes 252a and 252b divide the water splitter 240 into a plurality of base compartments B, acid compartments A, and salt compartments S. Each of the base compartments B is defined by a face of a cation permselective membrane and an anion face of a bipolar membrane; each of the acid compartments A is defined by a cation face of a bipolar membrane and a face of an anion permselective membrane; and each of the salt compartments S is defined by a face of an anion permselective membrane and a face of a cation permselective membrane. The anion face of each bipolar membrane is arranged toward the anode 248.

The mother liquor is fed to the base compartments B via the lines 237a and 237b wherein sodium hydroxide is produced and the sodium bicarbonate is converted into sodium carbonate. The solution containing sodium carbonate and sodium hydroxide is removed via lines 262a and 262b and supplied to line 262. The concentration of the sodium carbonate in stream 262 is normally in the range of about 14 to 23 weight % and preferably about 18 weight % (with about 3 weight % sodium hydroxide present). The product solution in line 262 in conveyed to a product storage tank 263 and then forwarded to a dissolution tank 265 via a line 264 for contact with, e.g., trona which is added to 265 via a line 268 in an amount to produce about a 30 weight % sodium carbonate containing solution. The 30 weight % $Na_2CO_3$ containing solution is then removed via a line 270 and further processed. The embodiments illustrated in FIGS. 3 through 5 and described in detail hereinbelow, illustrate alternative methods for treating the sodium carbonate containing solution removed from line 262 to produce a 30 weight % $Na_2CO_3$ solution.

Simultaneously with the feed of mother liquor to the base compartments, an aqueous solution containing a source of sodium ions (sodium sulfate) removed from the acid tank 230 via the line 260 is introduced, via lines 260a and 260b, into salt compartments S. In salt compartments S, Na+ ions migrate to the base compartments B. The partially acidified salt is withdrawn via lines 234a and 234b and forwarded to the acid compartments A wherein an acidified solution is formed comprising sodium sulfate/sulfuric acid [as $NaHSO_4(aq)$] which is removed from acid compartments A via lines 258a and 258b. The reaction product withdrawn from the acid compartments A is fed via a line 258 to the acidification tank 230 for contact with the sodium bicarbonate.

Figure 3:
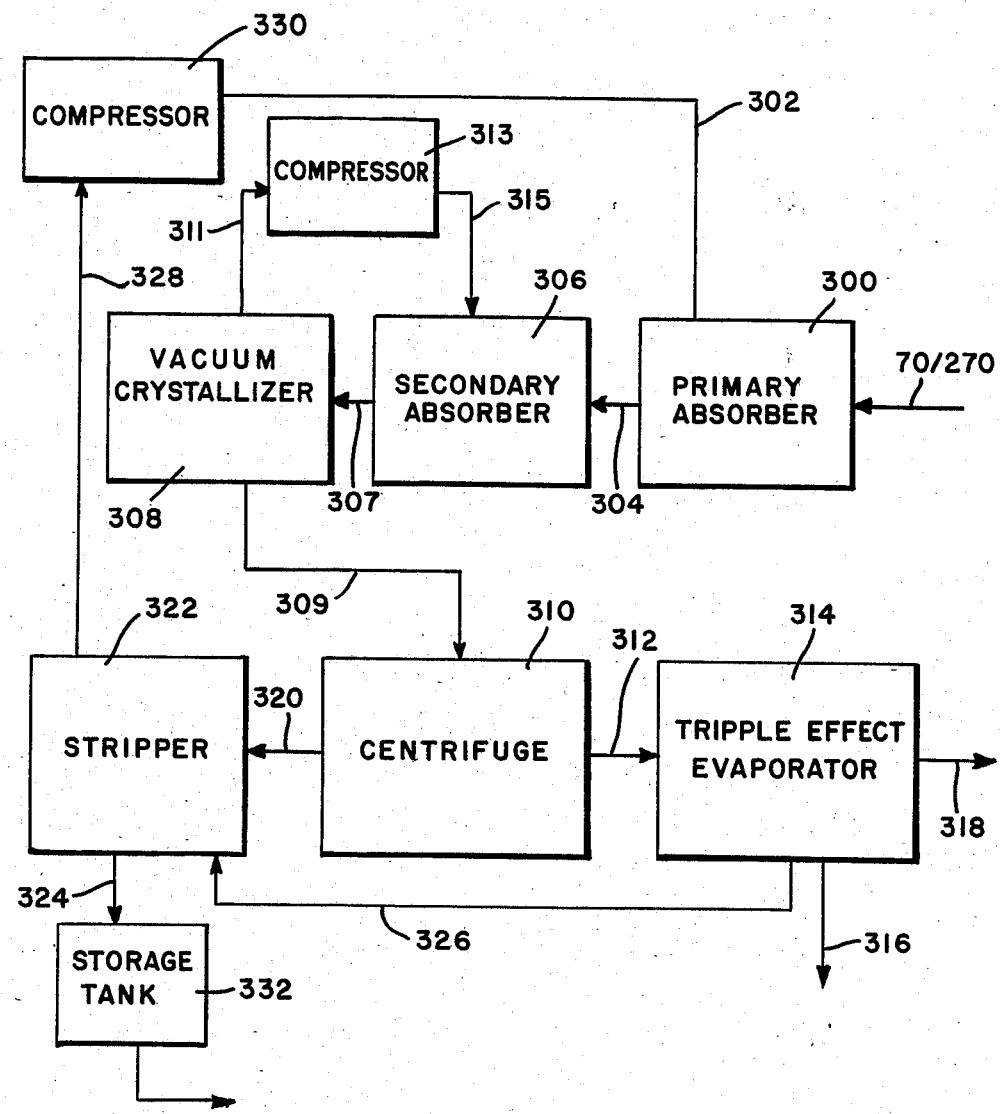
FIG. 3 is a flow diagram of a preferred embodiment of the present invention having an improved means for obtaining a more concentrated $Na_2CO_3$ product solution.

Referring to FIG. 3, the product sodium carbonate solution from the base compartments B is fed via the line 70(or 270) to primary absorber 300 wherein a liquid loading substance, supplied from a line 302, is absorbed into the sodium carbonate solution. As used herein, a "liquid loading substance" refers to a liquid such as ammonia, methanol, ethanol and the like, which is added to the sodium carbonate solution to cause the sodium carbonate to crystallize out as the decahydrate, monohydrate or mixtures thereof and which, as a reaction product, can be readily separated from the crystallized sodium carbonate-containing material. The product from the primary absorber 300 which, for example, was contacted with ammonia and preferably contains about 18.8% $Na_2CO_3$ and 11.7% $NH_3$ (14.4% $Na_2CO_3$ on a free basis), is then fed via a line 304 to a secondary absorber 306 where additional liquid loading substance, such as ammonia, is absorbed by the solution. The secondary absorber product is then cooled to about 28° C. by a heat exchanger (not shown) and is then fed via a line 307 to a vacuum crystallizer 308. Vacuum crystallizer 308 operates conveniently at about 7 psia and is maintained adiabatically at a temperature of about 20° C. throughout the evaporation of the liquid loading substance. The evaporated liquid loading substance (e.g., ammonia) is fed via a line 311 to a compressor 313 wherein it is compressed (for ammonia to about 10.2 psia) and then fed through a line 315 back to the secondary absorber 306 wherein it is reused.

A crystallized product comprising sodium carbonate decahydrate is produced in the crystallizer 308. The crystallized product and any remaining aqueous ammonia and sodium carbonate solution is fed along a line 309 to a centrifuge 310. The crystallized product is separated from the other constituents and fed via a line 312 to a crystal product melter (not shown). In the melter, the crystals are heated to about 35° C. to produce a slurry, which then passes through a heat exchanger (not shown) for further heating to about 60° C. enroute to a triple effect evaporator 314 fed by a line 312. The evaporator 314 converts the crystals to the monohydrate form, after which the crystals are fed to a storage tank 316 for later use.

After separation from the sodium carbonate decahydrate crystals in centrifuge 310 as described above, the remaining aqueous ammonia and sodium carbonate solution is fed via a line 320 to an ammonia stripper 322. Additionally, any ammonia removed by evaporator 314 is fed as a stream 326 to the stripper 322. The stripper provides a 96% ammonia concentration at 4.5 psia. The ammonia is then fed via a line 328 to a compressor 330, wherein it is compressed from about 4.5 psia to about 6.0 psia after which it is fed via a line 302 back to the primary absorber 300 for reuse. The sodium carbonate solution is fed via a line 324 to a weak liquor tank 332 for recycling in the basic system of FIG. 1 or FIG. 2.

The applied pressures and temperatures recited in the description of the process illustrated by FIG. 3 are provided as workable examples. Other pressures and temperatures obvious to those of ordinary skill in this art may be employed without departing from the scope of the present invention.

Figure 4:
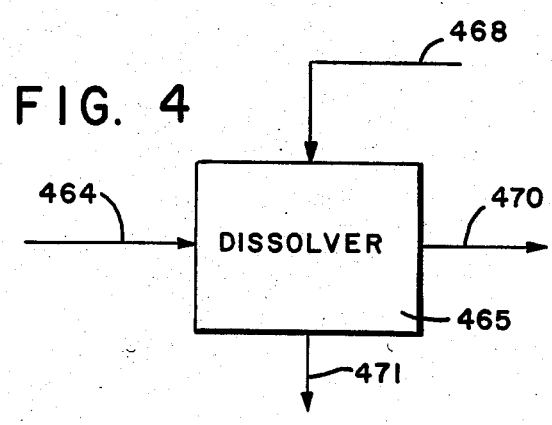
FIGS. 4 and 5 are flow diagrams of alternative embodiments of the present invention for increasing the concentration of the $Na_2CO_3$ solution removed from electrodialytic water-splitting process illustrated in FIGS. 1 or 2.
Figure 5:
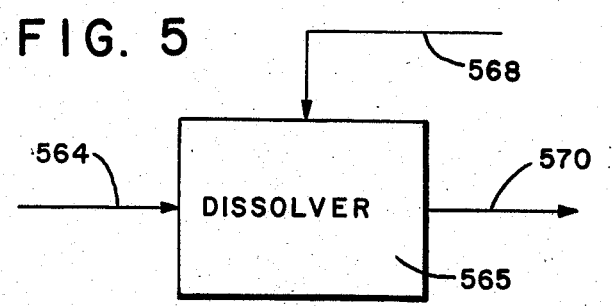

FIGS. 4 and 5 illustrate alternate embodiments for processing sodium carbonate solution removed from the base compartments B of the two- and three-compartment electrodialytic water splitters. In FIG. 4, the sodium carbonate solution containing NaOH is fed through lines 64 or 264 to a dissolver 465 via a line 464. In dissolver 465, the sodium carbonate solution is contacted with crude uncalcined trona from a line 468 thereby to form about a 30 weight % sodium carbonate-containing solution which is then removed from dissolver 465 via a line 470. The insolubles produced by this process are removed from dissolver 465 via a line 471.

In FIG. 5, the sodium carbonate solution removed from the base compartments B of the two- and three-compartment electrodialytic water splitters is added to a dissolver 565. To dissolver 565 is also added sodium carbonate via a line 568. The sodium carbonate added by the line 568 may be obtained by calcining the sodium bicarbonate precipitated from the crystallizers 26 and 226 in FIGS. 1 and 2 or, alternately, obtained from sodium sesquicarbonate. The 30 weight % sodium carbonate solution is then removed from dissolver 565 via line 570.

Figure 6:
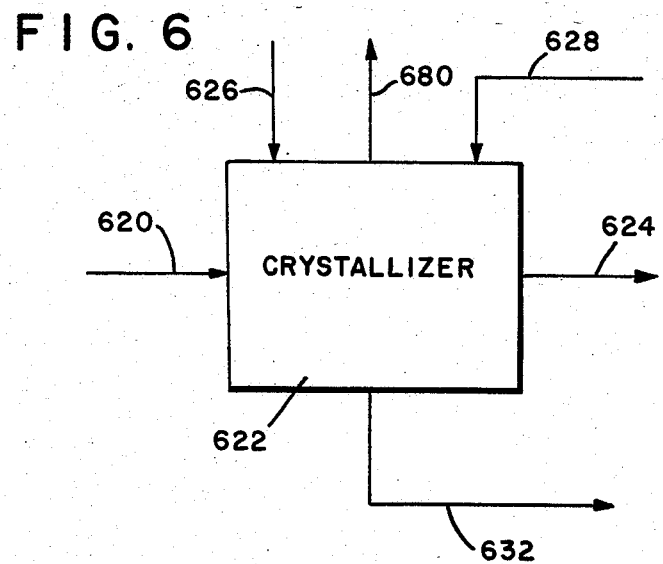
FIG. 6 is a flow diagram illustrating an alternative use of the crystallizer of FIG. 1 or 2.

An alternate embodiment of the crystallizers 22 and 222 illustrated in FIGS. 1 and 2, respectively, is shown in FIG. 6. A concentrated trona solution is fed via a line 620 to a crystallizer 622. By removing water from crystallizer 622 via a line 680 and/or by adding carbon dioxide via a line 626 (obtained from acidification tanks 30 and 230 of FIGS. 1 and 2, respectfully) the relative amounts of solids (solid sodium bicarbonate or crystallized trona) in the sodium carbonate/sodium bicarbonate solution can be adjusted. Further modifications of the amounts of solids may also be accomplished by controlling the temperature in the crystallizer 622. The aqueous solution of sodium carbonate and sodium bicarbonate is removed from the crystallizer 622 via line 632 and forwarded to the base compartments B of the two- and three-compartment electrodialytic water splitter. The sodium bicarbonate solid and/or sodium sesquicarbonate (trona) solid is removed the from crystallizer 622 via a line 624 and thereafter forwarded for the production of sodium cations for use in the acid and/or salt compartments of the two- and three-compartment electrodialytic water splitters.

The invention is further illustrated by reference to the following examples, the details of which are not to be construed as limiting the invention which is defined by the appended claims.

EXAMPLE 1

The electrodialysis stack used contained one unit cell having an effective path length (diameter) of 3.74 cm. The stack consisted of, in order, a platinum anode, a Selemion ® CMV (Asahi Glass Co.) strongly acidic cation permselective membrane, a CMV cation permselective membrane and a cast-bipolar membrane with the anion permeable side facing the anode, another CMV membrane and, a platinum cathode. The cast-bipolar membrane was prepared by a procedure disclosed in U.S. Pat. No. 4,116,889 which is hereby incorporated by reference. The membranes were held in place and separated by polyfluorocarbon gaskets which contained ports for pumping the solution through the 1/16" (2.18 mm) thick solution compartments formed by the gasket and the membrane. A cell (1.2 cm thick) with 5 compartments was thereby formed, the compartments being, in order, anolyte, acid, base, acid and, catholyte. The anolyte and catholyte were supplied with 2 L of 0.5 M $Na_2SO_4$ from a common reservoir.

The acid compartments were charged with a 4 L of a 5% $NaHCO_3$ solution. The base compartment was charged with an uncalcined trona solution (an aqueous solution having 0.695 M $NaHCO_3$ and 1.645 M $Na_2CO_3$). A direct current of 1.2 amperes was passed through the cell for a total of 4300 sec. The active area of the cell was 11 $cm^2$. After the passage of current, the final base solution had the following composition: 1.933 M $Na_2CO_3$ and 0.325 M $NaHCO_3$ As the current was passed, gas bubbles ($CO_2$) rose from the acid compartment. However, no attempt was made to measure or contain all of the $CO_2$ gas generated. The overall current efficiency for total base production was 95.4% (95.9% based on $Na_2CO_3$ gain and 94.9% based on $NaHCO_3$ loss). The average cell potential was 2 volts. No precipitates were observed in any of the compartments.

EXAMPLE 2

The acid compartment of an electrodialysis cell of the type used in EXAMPLE 1 was charged with a solution of $NaHCO_3$. The base compartment of the cell was charged with 148.5 mL of a 1.261 M NaOH and 2.303 M $Na_2CO_3$ solution. A direct current of 1.2 amp was passed through the cell for a total of 4000 sec. After the passage of the current, the solution in the base compartment had a volume of 153.3 mL and was 1.453 M NaOH and 2.241 M $Na_2CO_3$. Thus, the efficiency of NaOH generation was 71%, and a 7.4 M solution was transported.

EXAMPLE 3

The acid compartment of an electrodialysis cell of the type used in EXAMPLE 1 containing the one unit cell was charged with a solution of $NaHCO_3$. The base compartment of the cell was charged with 147.3 mL of 0.2225 M $NaHCO_3$ and 2.271 M $Na_2CO_3$ solution. A direct current of 1.2 amps was passed through the cell for 4000 sec. After the passage of the current, the solution in the base compartment was 152.4 mL of 0.1125 M NaOH and 2.407 M $Na_2CO_3$. The $NaHCO_3$ was consumed and NaOH was generated with an efficiency of 100.4%.

EXAMPLE 4

To 300 mL of $H_2O$ heated to 80° C. was added 150 g of Green River Trona Ore. The mixture was stirred for 15 min. while the temperature was allowed to increase to 7° C. A portion of the resulting solution was filtered hot and a number of trona stones and a fine precipitate were collected. The fine precipitate blocked the filter, but most of it settled. The clarified solution was cooled to 35° C. and the precipitate was filtered off. The wet precipitate weighed 20 g, and the filtrate weighed 216 g. A 20 mL (23.939 g) aliquot of the filtrate analyzed at 0.78 M (5.5%) $NaHCO_3$ and 1.741 M (15.4%) $Na_2CO_3$. A 4.819 g portion of the wet precipitate was analyzed and the weight ratio of $NaHCO_3$ to $Na_2CO_3$ was 15.9 to 1. A 15.2 g portion of the wet sample provided 11.75 g of dry precipitate. The precipitate is essentially all $NaHCO_3$, and the majority of the $Na_2CO_3$ in the precipitate comes from the retained mother liquor.

EXAMPLE 5

The acid compartment of an electrodialysis cell of the type used in EXAMPLE 1 having one unit cell was charged with a solution of $NaHCO_3$. The base compartment of that cell was charged with 134.5 mL of a 0.7240 M $NaHCO_3$ and a 1.788 M $Na_2CO_3$ solution. A direct current of 1.20 amp was passed through the cell for a total of 24,000 sec. during which time the $NaHCO_3$ was consumed and NaOH was produced. At 4000 sec intervals, a 5 mL sample was taken from the base zone and analyzed. The results of the experiment are set forth in the following Table I:

TABLE I

| Interval (sec) | Volume in base zone (mL) | | Conc (M) of $NaHCO_3$ or (NaOH) base zone | | Conc (M) of $Na_2CO_3$ in base zone | | $\eta$ $CO_3=$ |
| --- | --- | --- | --- | --- | --- | --- | --- |
| | Initial | Final | Initial | Final | Initial | Final | |
| 0–4000 | 134.5 | 139.2 | 0.7240 | .3667 | 1.788 | 2.058 | .931 |
| 4000–8000 | 134.2 | 139.2 | 0.3667 | .0087 | 2.058 | 2.322 | .965 |
| 8000–12000 | 134.2 | 139.5 | 0.0087 | (0.3227) | 2.322 | 2.254 | .924 |
| 12,000–16,000 | 134.5 | 139.5 | (0.3227) | (0.6120) | 2.259 | 2.179 | .846 |
| 16,000–20,000 | 134.2 | 139.2 | (0.6120) | (0.8760) | 2.179 | 2.113 | .797 |
| 20,000–24,000 | 134.6 | 139.6 | (0.8769) | (1.113) | 2.113 | 2.054 | .738 |

The final solution in the base compartment was 3.65% NaOH and 17.86% $Na_2CO_3$. If trona ore was dissolved in this solution, a $Na_2CO_3$ concentration of 30.8% would result. Thus, this experiment shows that a process of converting a solution of $Na_2CO_3/NaHCO_3$ to $NaHCO_3/NaOH$ capable of giving a 30% solution of $Na_2CO_3$ on reaction with trona proceeds with high efficiency by electrodialytic water splitting.

For a commercial scale water splitter employing multiple unit cells, external acidification such as illustrated in Example 10 is preferred over application of a back pressure to control $CO_2$ generation.

EXAMPLE 6

Two experiments were performed employing an electrodialysis cell of the type described in EXAMPLE 1 having one unit cell. In each experiment, the acid compartment of the cell was charged with an approximately 0.5 M $NaHCO_3$ solution. The base compartment of the cell was charged with 139.3 mL of a 0.995 M NaOH and a 0.0118 M $Na_2CO_3$ solution in one experiment (Expt 1), and with 144.3 mL of a 1.76 M NaOH and 0.0073 M $Na_2CO_3$ in the other (Expt 2). A direct current of 1.2 amp was passed through the cell for 20,000 sec in Expt 1 and for 12,000 sec in Expt 2. In both experiments, 5 mL samples were withdrawn from the base compartment and analyzed at 4,000 sec intervals. The results of these experiments are set forth in the following Table II.

TABLE II

| Interval ($\times 10^{-3}$ sec) | Volume in base zone (mL) | | Conc of NaOH (M) | | | Conc of $Na_2CO_3$ (M) | | |
|---|---|---|---|---|---|---|---|---|
| | Initial | Final | Initial | Final | $\eta OH^-$ | Initial | Final | $\eta CO_3^=$ |
| Expt. 1 | | | | | | | | |
| 0–4 | 139.3 | 143.7 | 0.995 | 1.246 | .813 | .0119 | .0103 | −.003 |
| 4–8 | 138.7 | 143.1 | 1.246 | 1.485 | .798 | .0103 | .0138 | +.011 |
| 8–12 | 138.1 | 142.4 | 1.485 | 1.709 | .770 | .0138 | .0273 | +.040 |
| 12–16 | 137.4 | 141.3 | 1.709 | 1.893 | .657 | .0273 | .0308 | +.012 |
| 16–20 | 136.3 | 140.2 | 1.893 | 2.092 | .709 | .0308 | .0245 | −.015 |
| Expt. 2 | | | | | | | | |
| 0–4 | 144.3 | 149.0 | 1.764 | 1.951 | .727 | .0073 | .0123 | +.016 |
| 4–8 | 144.0 | 148.2 | 1.951 | 2.113 | .647 | .0123 | .0133 | +.004 |
| 8–12 | 143.2 | 147.5 | 2.113 | 2.301 | .740 | .0133 | — | — |

The concentration of NaOH produced is 8–9 M. The results of these experiments show that the production of up to 8% NaOH from $NaHCO_3$ with high current efficiency is achievable. The results also indicate that a 30% solution of $Na_2CO_3$ could be produced by dissolving trona in an 8–9% NaOH solution produced by water splitting using $NaHCO_3$ or $NaHCO_3/Na_2CO_3$ as the source of sodium ions ($Na^+$).

EXAMPLE 7

To 750 ml of $H_2O$ heated to about 90° C. was added 308 g of Green River Trona ore. The mixture was then stirred for about 12 mins, and then allowed to settle for about 9 min to allow sedimentation of solids. About 900 ml of a clear supernatant was removed leaving a suspension including rocks which contained undissolved trona. The rocks, weighing about 70 g, were removed and the suspension was reheated and allowed to settle for an additional time which allowed further sedimentation of suspended solids. An additional 60 ml of supernatant was drained off, and the combined supernatants were cooled to 35° C., and then stirred for 1 hr. During the 1 hr period, 45 g of $NaHCO_3$ crystallized from solution and was collected by filtration. The $NaHCO_3$ crystals were dissolved in 700 mL of $H_2O$ forming a 0.619 M $NaHCO_3$/0.0743 M $Na_2CO_3$ solution, and the resulting solution was charged into the acid compartment of an electrodialysis cell of the type use in EXAMPLE 1 having one unit cell. A 144.6 mL aliquot of the filtrate was fed into the base compartment of the cell.

A direct current of 1.2 amp was passed through the cell for a total of 16,000 sec. At every 4,000 sec. interval, a 5 ml sample was taken from the base compartment and analyzed. The results of this experiment are summarized in Table III.

TABLE III

| | BASE ZONE | | | | |
|---|---|---|---|---|---|
| Interval ($\times 10^{-3}$ Sec) | Volume (mL) | | Conc of $NaHCO_3$ and (NaOH) (M) | | |
| | Initial | Final | Initial | Final | $\eta OH^-$ |
| 0–4 | 144.6 | 148.7 | .8067 | .4800 | .910 |
| 4–8 | 143.7 | 147.6 | .4800 | .1720 | .876 |
| 8–12 | 142.6 | 147.5 | .1720 | (.1640) | .879 |
| 12–16 | 142.5 | 146.7 | (.1640) | (.4467) | .848 |

The concentration of $NaHCO_3$ in the final acid was 0.525 M and the acid contained no $Na_2CO_3$. Following the experiment, bipolar membrane potential drop was 1.11 V at 100 A/ft$^2$, which indicates that electrodialytic water splitting of $NaHCO_3/Na_2CO_3$ solutions derived from Trona ore behaves in a fashion similar to synthetic solutions. Rapid fouling of the membrane did not occur and membrane appearance did not change during the experiment.

Examples 1–7 illustrate operation of the present invention with internal acidification of carbonate and bicarbonate and generation of $CO_2$ within the acid zone. The cell employed in these examples was circular, had a relatively short path length and, as such, was operated without application of a back pressure. The following Examples illustrate the need for application of a suitable back pressure to control $CO_2$ generation in operation of the process illustrated by Examples 1–7 in a large cell, and the more economically practicable embodiment of acidification of the sodium carbonate/bicarbonate feed solution external to the acid zones.

EXAMPLE 8

Two-compartment Water Splitting Test With External Acidification to Liberate $CO_2$ A 181 day test at a current density of 107 ma/cm$^2$ was carried out using a purified trona-derived solution in a two-compartment water splitter stack containing nine unit cells, each having 1 dm$^2$ active area. The stack consisted of: a platinum anode; anolyte compartment; nine unit cells, each unit cell having a Nafion ® 110 strongly acidic cation permselective membrane, and a bipolar membrane prepared as described in U.S. Pat. No. 4,116,889 thereby forming alternating base and acid compartments; a catholyte compartment; and, a platinum cathode. A 0.5 M $Na_2SO_4$ solution was fed from a tank to the anolyte and catholyte compartments. The acid circulation loop contained 10 weight percent $Na_2SO_4$, 4 weight percent $NaHSO_4$ and the base circulation loop contained 20 weight percent $Na_2CO_3$ and 4 wt % $Na_2SO_4$. The overflow from the acid and base recycle tank was fed into a feed tank to form a solution of 20 wt % $Na_2SO_4$ and 1 wt % $NaHSO_4$. The feed tank solution was then continuously metered into acid and base recirculation tanks. During the mixing process, $CO_2$ was liberated in the feed tank and $CO_2$ was vented into the base tank to combine therein with the NaOH generated in the base loop. Make-up $CO_2$ was added to the base tank from a high pressure $CO_2$ cylinder. The acid and base solutions were derived from dissolution of trona (crude sodium sesquicarbonate) in hot water. After purification to remove insolubles, the trona solution was cooled to room temperature and $NaHCO_3$ crystallized out. The mother liquor, after filtration of $NaHCO_3$, was rich in $Na_2CO_3$ and was used in the base recycle loop. The recovered solid $NaHCO_3$ was acidified with sulfuric acid to evolve $CO_2$ and to form a $Na_2SO_4$ solution which was used in the acid recirculation tank and the feed tank at the beginning of the test. Periodically, the solutions in the three tanks were replaced with fresh trona-derived solutions so as to provide ready comparison of performance over the 181 day test period.

During the 181 day test, the overall cell voltage remained essentially constant at 19 volts at 35° C. Upon disassembly of the stack at the conclusion of the test, the bipolar membranes were in excellent physical and mechanical condition. The potential drop across the bipolar membranes had increased only 0.1 to 0.15 volts (total increase) during the extended 181 day test. External acidification to liberate gases outside the acid compartment clearly has a beneficial effect on the bipolar membrane stability.

EXAMPLE 9

Attempted Two-compartment Water Splitting Test With Internal Acidification and Liberation of $CO_2$ The electrodialytic stack of Example 8 was used. A current density of 107 ma/cm was used. The solution fed to the acid compartments was saturated (about 10–12 wt % $NaHCO_3$) The solution fed to the base compartment was a purified trona-derived mother liquor containing 6 wt % $NaHCO_3$ and 16 wt % of $Na_2CO_3$. Bubbles of $CO_2$ gas almost immediately filled the acid compartment. The voltage drop increased to 25 volts almost immediately and the current density decreased to <70 ma/cm$^2$. Stable operation could not be maintained so the test was stopped.

EXAMPLE 10

Figure 7:
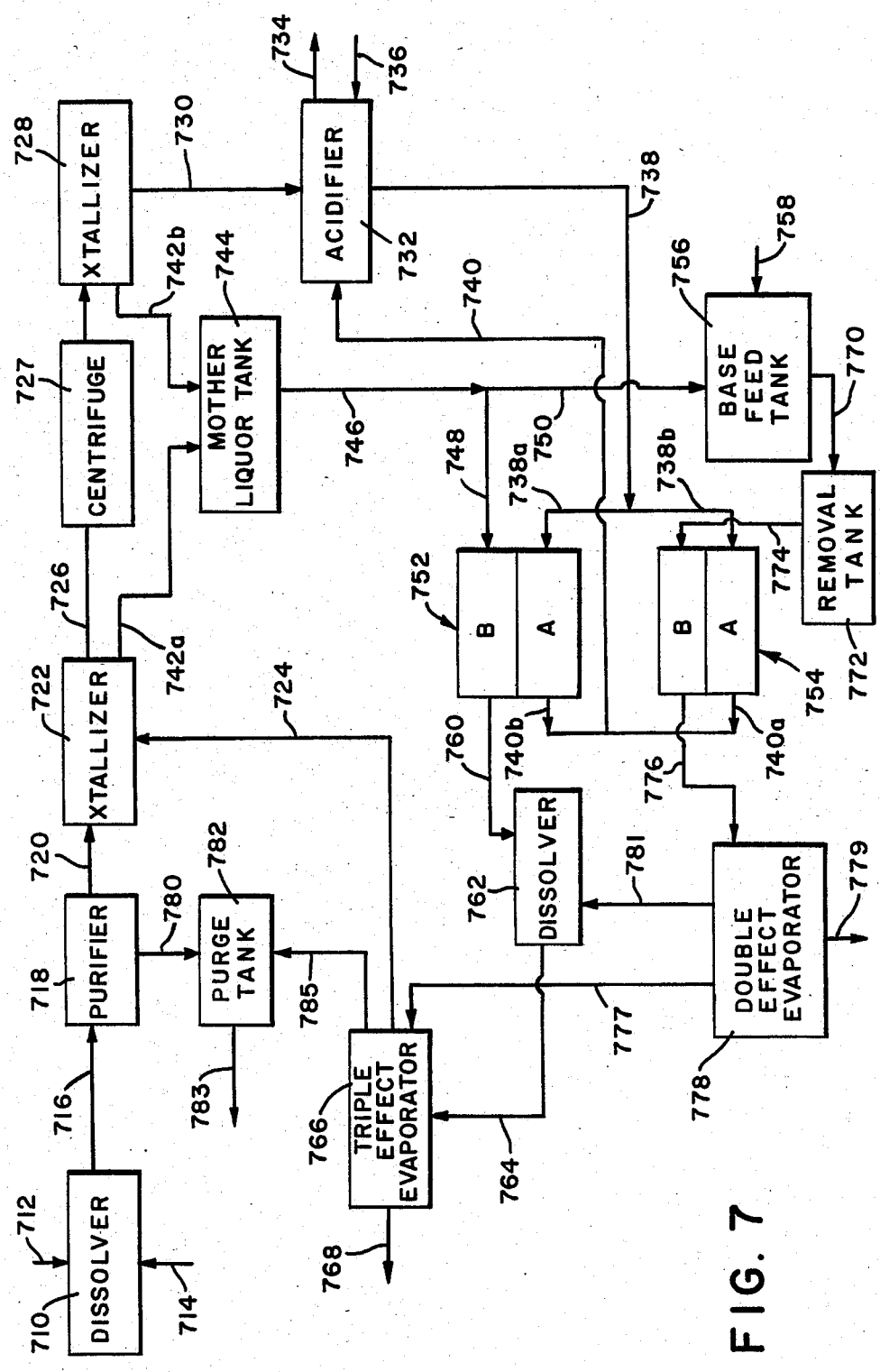
FIG. 7 is a flow diagram illustrating another embodiment of the present invention using the water-splitter described in FIG. 1.

This Example describes an alternate embodiment of the present invention illustrated in FIG. 7 utilizing two-compartment water splitting to generate sodium carbonate and sodium hydroxide from trona ore. To a dissolver 710 equipped with a stirrer 711, is added trona ore via a line 712 and live steam via a line 714 to form a slurry of sodium carbonate/sodium bicarbonate and insolubles which is removed from the dissolver 710 via a line 716 and forwarded to a liquor purification tank 718. An aqueous sodium carbonate/sodium bicarbonate solution is removed from the tank 718 via a line 720 and forwarded to a crystallizer 722. Sodium bicarbonate solid, formed in the crystallizer 722, is removed via a line 726 and is fed to a centrifuge 727. The remaining aqueous solution of sodium carbonate and bicarbonate (mother liquor) is removed from the crystallizer 722 via a line 742a. In a secondary crystallizer 728, a more concentrated sodium carbonate solid and/or slurry is formed and removed via a line 730 to acid tank 732. An aqueous solution of sulfuric acid/sodium sulfate is added, via a line 740, to the tank 732. The source of sulfuric acid/sodium sulfate is the reaction product from the acid compartments A of the two-compartment electrodialytic water splitters 752 and 754 which is withdrawn via lines 740a and 740b, respectively. The composition of the source comprises about 1 to 15 weight % of sulfuric acid and about 10 to 30 weight % of sodium sulfate. In the acid tank 732 sodium bicarbonate reacts with sulfuric acid (from the source and also supplied via a line 736) to form sodium sulfate and carbon dioxide (which is removed via a line 734). The sodium sulfate produced in the acid tank 732 is removed via a line 738 for supply (via lines 738a and 738b) to the acid compartments of the two-compartment water splitters.

The sodium carbonate/sodium bicarbonate mother liquor from the crystallizers 722 and 728 is supplied via lines 742a and 742b to a mother liquor tank 744 and is maintained therein at a temperature of about 38° C. Mother liquor in the tank 744 is removed via a line 746 and forwarded via a line 748 to the base compartments B of the electrodialytic water splitter 752 wherein hydroxide ions and sodium ions are added to form a sodium carbonate solution. The resulting sodium carbonate solution is removed from the water splitter 752 via a line 760 and supplied to a dissolver 762.

Simultaneously with the supply of mother liquor to the water splitter 752, a portion of the mother liquor in line 746 is diverted via a line 750 to a base feed tank 756. Base feed tank 756 is supplied with sodium carbonate/sodium bicarbonate from dissolvers (not shown) via a line 758. The solution is removed from the tank 756 via a line 770 and is forwarded through an organics removal tank 772 to (via a line 774) the base compartment B of the electrodialytic water splitter 754. The base compartment B of splitter 754 produces a solution of sodium carbonate and sodium hydroxide which is removed via a line 776 and forwarded to a double effect evaporator 778. A solution comprising about 50 weight % sodium hydroxide is removed from the double effect evaporator 778 via a line 779. Recovered sodium carbonate solids removed from the double effect evaporator 778 are forwarded via a line 781 to a dissolution tank 762.

A sodium carbonate-containing solution (containing about 30 wt % $Na_2CO_3$) produced in dissolving tank 762 (held at a temperature of 65° C.) is forwarded via a line 764 to a triple effect evaporator 766. Steam from the double effect evaporator 779 is supplied to the triple effect evaporator via a line 777. The triple effect evaporator 766 is operated to produce a sodium carbonate monohydrate product which is removed via a line 768 for storage and later use. A purge from the evaporator 766 is removed via a line 785 and forwarded to the tank 782. The purge from the liquor purification tank 718 is also added to the tank 782 via a line 780. Excess purge is periodically drawn from the tank 782 through the line 783 and delivered to a waste pond.

Exemplary mass flows through the lines in FIGS. 7 are given in Table 5 below to aid in clarifying the operation of the process above-described but do one necessarily reflect actual conditions for the operation of the process. The mass flows are given for the coproduction of soda ash (3600 tons/day soda ash, instantaneous rate; 1 million tons per year production) and sodium hydroxide (1290 tons/day of sodium hydroxide, instantaneous rate; 358,000 tons per year production).

TABLE 5

| Stream | $Na_2CO_3$ | $NaHCO_3$ | $CO_2$, $Na_2SO_4$ or NaOH | $H_2O$ |
|---|---|---|---|---|
| 712[2] | 308856 (s)[3] | 244511 (s) | | 112793 |
| 720 | 306888 (l)[4] | 135579 (l) | | 1361389 (l)[4] |
| | 11355 (s)[3] | 105980 (s) | | 3860 (s)[3] |
| 730 | 2636 (l) | 547 (l) | | 10821 (l) |
| | 55956 (l) | 186659 (s) | | 19004 (s) |
| 734 | | | 122381 $CO_2$(g)[5] | 6441 (g)[5] |
| 746 | 259651 (l) | 54353 (l) | | 1045190 (l) |

TABLE 5-continued

| Stream | Na$_2$CO$_3$ | NaHCO$_3$ | CO$_2$, Na$_2$SO$_4$ or NaOH | H$_2$O |
|---|---|---|---|---|
| 748 | 178913 (1) | 37452 (1) | | 720190 (1) |
| 750 | 80738 (1) | 16901 (1) | | 325060 (1) |
| 760 | 220343 (1) | 4621 (1) | 261 Na$_2$SO$_4$ (1) | 755999 (1) |
| 764 | 343499 (1) | 2228 (1) | | 764409 (1) |
| 768 | 5060 (1) | 100 (1) | | 11134 (1) |
|  | 310800 (s) | | | 72780 (s) |
| 774 | 96538 (1) | 16901[6] (1) | | 434367 (1) |
| 776 | 117865 (1) | 1967 (1) | 109684[7] (1) | 654667 (1) |
| 779 | 540 (1) | | 107484[7] (1) | 106944 (1) |
| 781 | 733 (1) | 63 (1) | 2200[7] (1) | 7480 (1) |
|  | 116592 (s) | 1904 (s) | | |
| 783[8] | 18312 (1) | 2952[6] (1) | 2128 NaOH (1) | 112444 (1) |

[1] All streams are in pounds/hour
[2] Stream 714 also contains 90,840 lb/hr of insolubles
[3] Solid phase
[4] Solution phase
[5] or vapor phase
[6] Streams 774 an 783 contain 16901 and 2952 lb/hr of NaHCO$_3$, respectively.
[7] Streams 776, 779 and 781 contain 109684, 107484 and 2200 lb/hr of NaOH, respectively
[8] Stream 783 also contain 90840 lb/hr of insolubles.

(Representative embodiments of the present invention) have been presented to more particularly illustrate the invention. It will be apparent to those of ordinary skill in this art that various changes and modifications may be made therein without departing from the scope and spirit of the invention.

We claim:

1. A process for converting materials comprising sodium carbonate and sodium bicarbonate into a liquid comprising sodium carbonate substantially free of sodium bicarbonate comprising the steps of:
  (a) forming an aqueous solution comprising sodium carbonate and sodium bicarbonate;
  (b) removing a portion of said sodium bicarbonate from said solution to form a mother liquor comprising sodium carbonate and a reduced amount of sodium bicarbonate;
  (c) subjecting the mother liquor to electrodialytic water splitting by circulating the mother liquor through a bare compartment of an electrodialytic water splitter to produce a liquid reaction product comprising sodium carbonate substantially free of sodium bicarbonate; and
  (d) withdrawing the liquid reaction product from the electrodialytic water splitter.

2. The process of claim 1 wherein the aqueous solution is formed by contacting a material comprising sodium carbonate and sodium bicarbonate with water having a temperature at least about 90° C.

3. The process of claim 1 wherein from about 20 to about 80 weight percent of the sodium bicarbonate content is removed from said solution during step (b).

4. The process of claim 3 wherein at least about 50 weight percent of the sodium bicarbonate is removed from said solution.

5. The process of claim 1 wherein said mother liquor comprises from about 12 to about 17 weight percent sodium carbonate.

6. The process of claim 1 wherein the electrodialytic water splitter comprises at least one two-compartment unit cell consisting of an acid compartment and a base compartment.

7. The process of claim 6 further comprising the step of circulating a source of sodium cations through the acid compartment of the two-compartment unit cell.

8. The process of claim 7 wherein the sodium cations are produced by the step of contacting a material comprising sodium bicarbonate with liquid removed from the acid compartment to produce the source of sodium cations, said source being substantially free of sodium bicarbonate and sodium carbonate.

9. The process of claim 1 wherein the electrodialytic water splitter comprises at least one three-compartment unit cell consisting of an acid compartment, a base compartment and a salt compartment.

10. The process of claim 9 further comprising the step of circulating a source of sodium cations through the salt compartment of the three-compartment unit cell.

11. The process of claim 10 further comprising the step of removing a liquid comprising sodium cations from the salt compartment and circulating the liquid comprising sodium cations through the acid compartment of the three-compartment unit cell.

12. The process of claim 11 wherein the sodium cations are produced by the step of contacting a material comprising sodium bicarbonate with liquid removed from the acid compartment to produce the source of sodium cations, said source being substantially free of sodium bicarbonate and sodium carbonate.

13. The process of claim 1 wherein the liquid reaction product comprises sodium carbonate in an amount at least about 2 weight percent greater than the weight percent of sodium carbonate in the mother liquor.

14. The process as in claim 1 wherein the liquid reaction product comprises sodium carbonate in an amount between about 14 and about 23 weight percent.

15. The process of claim 1 further comprising the step of processing the withdrawn liquid reaction product to produce a final product comprising at least about 30 weight percent sodium carbonate.

16. The process of claim 15 wherein the step of processing the withdrawn liquid reaction product comprises the steps of contacting the withdrawn liquid reaction product with a liquid loading substance and subsequently removing the liquid loading substance to yield a solid final product.

17. The process of claim 16 wherein the liquid loading substance is selected from the group consisting essentially of ammonia, methanol and ethanol.

18. The process of claim 15 wherein the step of processing the withdrawn liquid reaction product comprises the step of adding a material comprising sodium carbonate to the withdrawn liquid reaction product to produce the final product.

19. The process of claim 1 further including the additional step of modifying the concentration of sodium carbonate and sodium bicarbonate in the mother liquor prior to subjecting the mother liquor to electrodialytic water splitting.

20. The process of claim 19 wherein the mother liquor is modified by contacting the mother liquor with $CO_2$ gas.

21. A system for converting a material comprising sodium carbonate and sodium bicarbonate into a liquid comprising sodium carbonate substantially free of sodium bicarbonate comprising:
(a) a source of aqueous solution comprising sodium carbonate and sodium bicarbonate;
(b) sodium bicarbonate removal means for removing a portion of the sodium bicarbonate from the source to produce a mother liquor;
(c) an electrodialytic water splitter for removing substantially all of the remaining sodium bicarbonate from mother liquor to produce a liquid reaction product comprising sodium carbonate substantially free of sodium bicarbonate;
(d) means for withdrawing the liquid reaction product from the electrodialytic water splitter;
(e) means for supplying the aqueous solution from the source to the sodium bicarbonate removal means; and
(f) means for supplying the mother liquor to a base compartment of the electrodialytic water splitter.

22. The system of claim 21 wherein the electrodialytic water splitter comprises at least one two-compartment unit cell consisting of an acid compartment and a base compartment.

23. The system of claim 22 further comprising:
(g) a sodium cation generating means for generating a source of sodium cations substantially free of sodium carbonate and sodium bicarbonate;
(h) means for supplying sodium bicarbonate from the sodium bicarbonate removal means to the sodium cation generating means;
(i) means for supplying a treating agent to the sodium cation generating means to react with the sodium bicarbonate; and
(j) means for supplying the source of sodium cations to the acid compartment of the two-compartment unit cell.

24. The system of claim 23 wherein the means for supplying a treating agent is fluid communication with the acid compartment of the two-compartment unit cell, the liquid product constituting the treating agent.

25. The system of claim 21 wherein the electrodialytic water splitter comprises at least one-three-compartment unit cell consisting of an acid compartment, a base compartment and a salt compartment.

26. The system of claim 25 further comprising:
(g) a sodium cation generating means for generating a source of sodium cations substantially free of sodium carbonate and sodium bicarbonate;
(h) means for supplying sodium bicarbonate from the sodium bicarbonate removal means to the sodium cation generating means;
(i) means for supplying a treating agent to the sodium cation generating means to react with the sodium bicarbonate;
(j) means for supplying the source of sodium cations generated in the sodium cation generating means to the salt compartment of the three-compartment unit cell; and
k) means for removing acidified liquid generated in the salt compartment and for supplying the acidified liquid to the acid compartment of the three-compartment unit cell.

27. The system of claim 26 wherein the means for supplying a treating agent is in fluid communication with the acid compartment of the three-compartment unit cell to deliver liquid removed therefrom to the sodium cation generating means, the liquid constituting the treating agent.

* * * * *